ROBERT T. GILLESPIE.
Improvement in Clod Fender.
No. 125,732.　　　　　　Fig. 1.　　　　　Patented April 16, 1872.
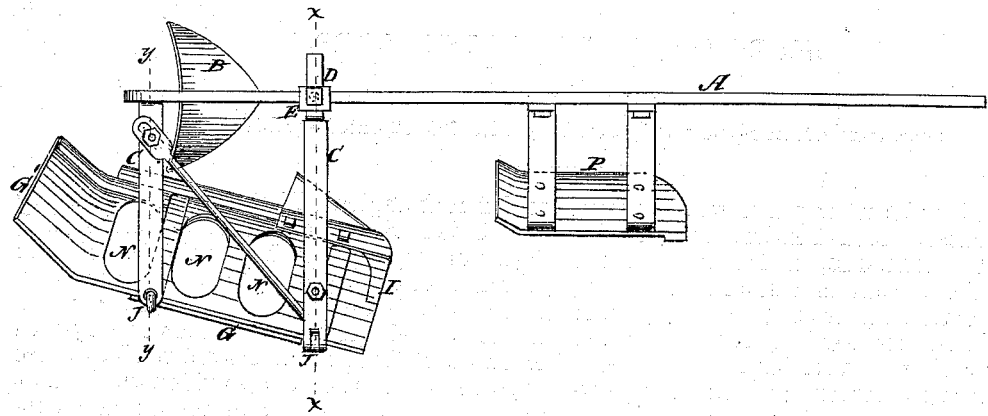
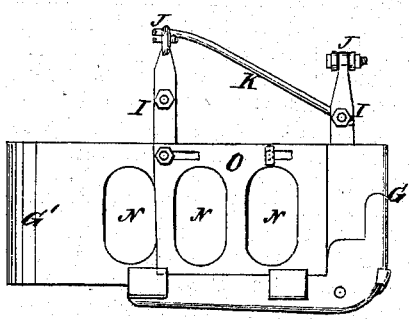
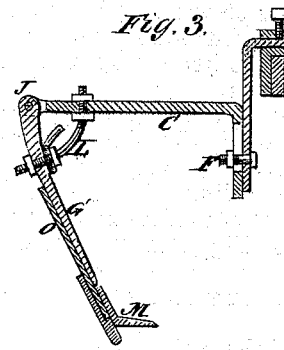
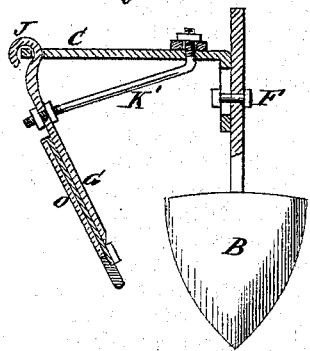
Witnesses:
E. Wolff.
Geo. W. Mabee
Inventor:
R. T. Gillespie
PER
Attorneys.

125,732

UNITED STATES PATENT OFFICE.

ROBERT T. GILLESPIE, OF MILLPORT, OHIO.

IMPROVEMENT IN CLOD-FENDERS.

Specification forming part of Letters Patent No. 125,732, dated April 16, 1872.

Specification describing a new and useful Improvement in Clod-Fender, invented by ROBERT T. GILLESPIE, of Millport, in the county of Columbiana and State of Ohio.

This invention relates to plows and other similar implements used in cultivating the soil; and consists in a fender connected with the plow or cultivator for protecting the growing plants from the clods of turf and from stones in the process of working between the rows of plants, the construction and arrangement of parts being as hereinafter more fully set forth and described.

In the accompanying drawing, Figure 1 represents a top view of a shovel-plow provided with my clod-fender. Fig. 2 is a side view of the fender detached. Fig. 3 is a vertical section of Fig. 1 taken on the line $x\,x$. Fig. 4 is a vertical section of Fig. 1 taken on the line $y\,y$.

Similar letters of reference indicate corresponding parts.

A is the beam of the plow. B is the blade or plow, made in one or more pieces in any of the well-known ways. C represents slotted angular bars, which project outward from the beam, adjustably connected with the beam by means of bolts. The angular piece D and the box-piece E are used in attaching the fender to old plows, as by this arrangement the fender may be attached to plows of different height. The vertical portion of the bars C are slotted, as seen in the drawing, so that they can be raised or lowered and fastened in any desired position by the bolts F. G is the fender, the rear end of which, G', is curved inward, as seen in Fig. 1. It stands at an angle of fifteen degrees (more or less) with a vertical line, and is connected with and supported by the angular bars C, by means of hinges or flexible connections, so as to allow the fender to be adjusted to different angles. The connection with the bars C is made by means of the straps I I, which are rigidly attached to the fender. The joints or flexible connections are seen at J J. The adjustment is made and the fender is held in the desired position by means of stay-rods or braces K K' and the curved rod L. These rods are so constructed or provided with double screw-nuts that the fender is held and supported in the proper position thereby. M is a share or scraper attached to the forward end of the fender-shoe, standing in a horizontal position, and is designed to run a little distance beneath the surface of the ground. N represents orifices in the fender, (more or less in number,) which allow more or less of the earth which is raised by the plow to pass through the fender. O is a shield, which by means of slots (see Fig. 2) may be adjusted to partially close the orifice N in the fender, so that young and tender plants will not be injured. When the fender is attached to a cultivator, a second fender, P, may be attached to the beam; but it is not needed on a plow or with single blades.

I do not limit or confine myself to the precise form, arrangement, or manner of constructing any of the parts described, as they may be varied in many ways without departing from my invention.

Having thus described my invention, I claim as new and desire to secure by Letters Patent—

The fender-shoe and scraper combined together, as described, and for the purpose set forth.

ROBERT T. GILLESPIE.

Witnesses:
C. C. ATKINSON,
WM. M. McCOMBS.